(12) United States Patent
Ng et al.

(10) Patent No.: US 7,988,466 B2
(45) Date of Patent: Aug. 2, 2011

(54) PORTABLE ELECTRONIC DEVICES

(75) Inventors: Lee-Han Ng, Shenzhen (CN); Lucas Huang, Shenzhen (CN)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/581,271

(22) Filed: Oct. 19, 2009

(65) Prior Publication Data

US 2010/0291780 A1 Nov. 18, 2010

(30) Foreign Application Priority Data

May 18, 2009 (CN) .......................... 2009 1 0302406

(51) Int. Cl.
*H01R 13/44* (2006.01)

(52) U.S. Cl. ........................................ 439/131; 439/138

(58) Field of Classification Search .................. 439/131, 439/136, 137, 138
See application file for complete search history.

(56) References Cited

U.S. PATENT DOCUMENTS

| | | | | |
|---|---|---|---|---|
| 6,312,270 B1 * | 11/2001 | Hamon | ......................... | 439/131 |
| 7,179,099 B2 * | 2/2007 | Hsieh | ............................. | 439/131 |
| 7,485,499 B2 * | 2/2009 | Brewer et al. | ................. | 438/125 |
| 7,558,069 B2 * | 7/2009 | Chung | ............................ | 361/737 |
| 7,674,120 B2 * | 3/2010 | Morganstern et al. | ........ | 439/131 |

* cited by examiner

*Primary Examiner* — Thanh-Tam T Le
(74) *Attorney, Agent, or Firm* — Steven M. Reiss

(57) ABSTRACT

A portable electronic device includes a connector case and defines a cavity communicating to the air. A guiding portion is formed in the cavity. The connector case includes at least one interface and an engaging portion. The engaging portion is slidably attached to the guiding portion. The at least one interface is exposed when the connector case slides out from the cavity.

14 Claims, 5 Drawing Sheets

PORTABLE ELECTRONIC DEVICES

BACKGROUND

1. Technical Field

The present disclosure relates to portable electronic devices, particularly, to a portable electronic device with USB interface.

2. Description of Related Art

With rapid development of information technology, portable electronic devices, such as cellular phones, personal digital assistant (PDA), etc., are becoming even more popular. The portable electronic device generally includes various interfaces, such as universal serial bus (USB) interface, microphone interface, etc., at sidewalls thereof, for, at least, transmitting information, facilitating charging the portable electronic device from a power supply and etc. Since the interfaces of the portable electronic devices are easily contaminated by, e.g., dust, covers are applied to protect the interfaces from dust. However, this may effect the appearance of the portable electronic device.

Therefore, there is room for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views, in which.

DETAILED DESCRIPTION OF THE EMBODIMENTS

Figure 1:
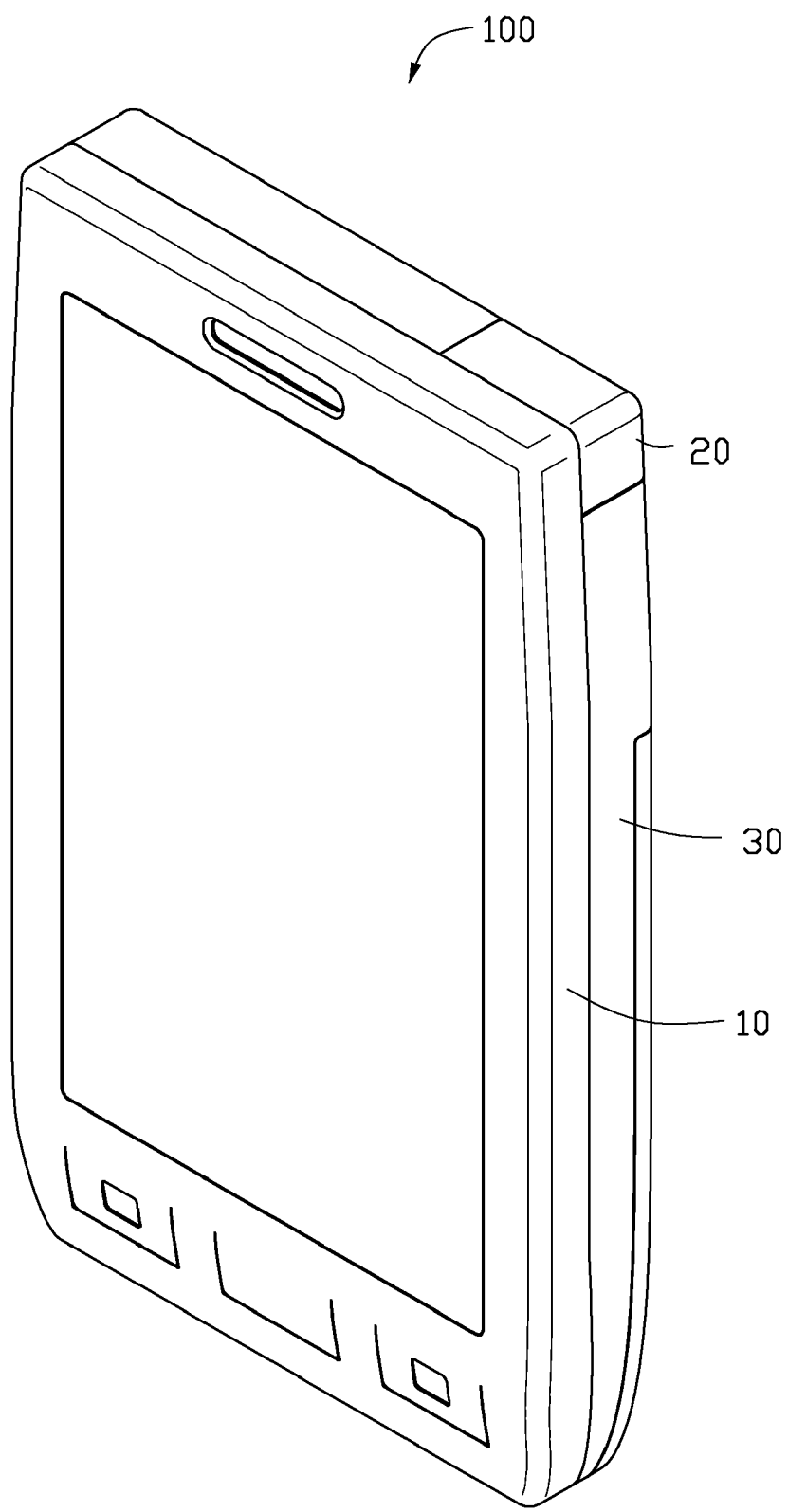
FIG. 1 is an assembled, schematic view of a portable electronic device in accordance with an exemplary embodiment, the portable electronic device including a connector case.

FIG. 1 shows an exemplary embodiment of a portable electronic device 100 such as a mobile phone. The portable electronic device 100 includes a first housing 10, a connector case 20 and a second housing 30.

Figure 2:
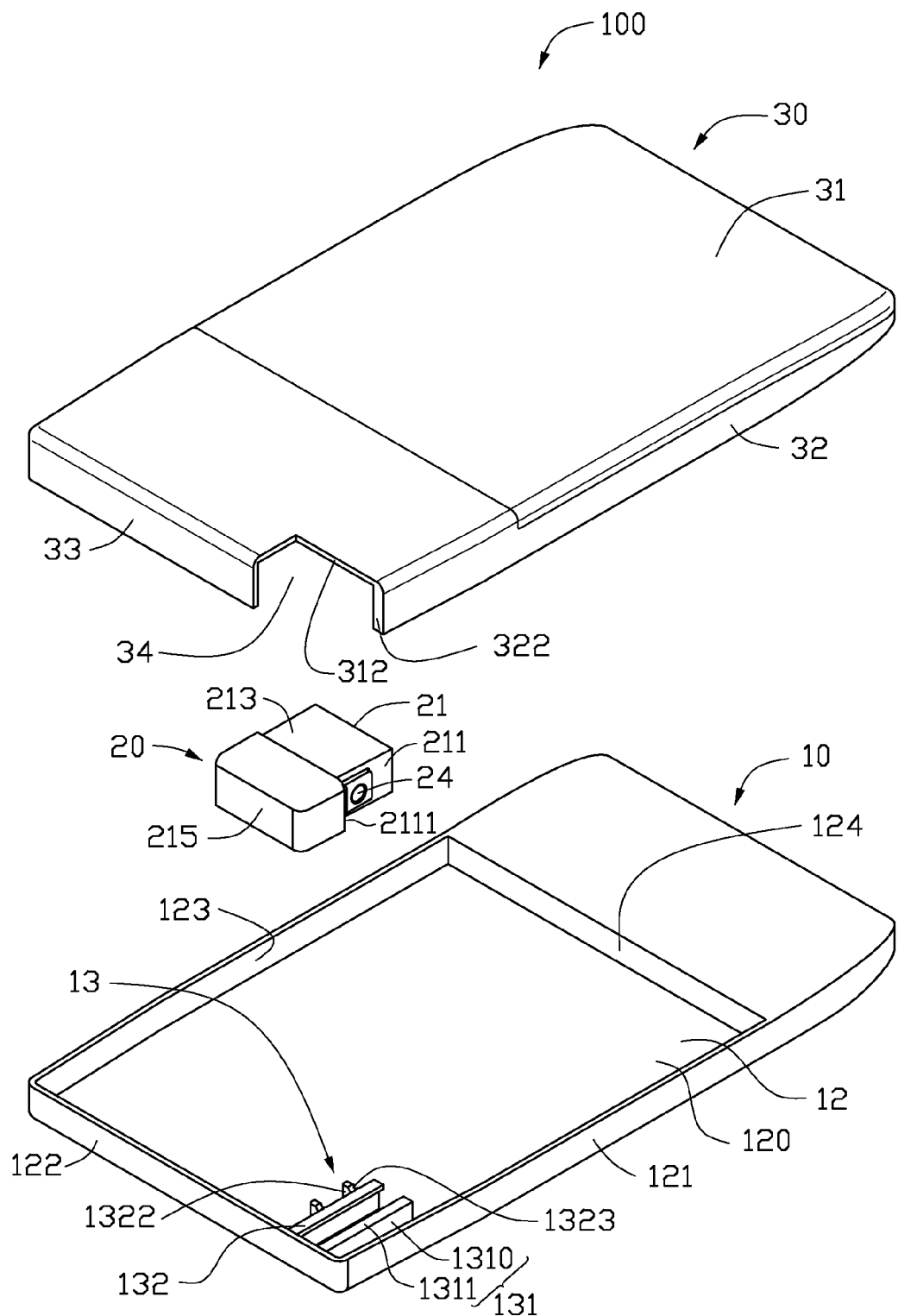
FIG. 2 is an exploded, schematic view of the portable electronic device shown in FIG. 1.

Referring to FIG. 2, the first housing 10 defines a cavity 12 at an end portion thereof. The cavity 12 is cooperatively defined by a bottom board 120, two sidewalls 121,123 and two end surfaces 122,124 connecting with the sidewalls 121. A guiding portion 13 is formed near a corner of the cavity 12 on the bottom board 120. The guiding portion 13 includes a first rail 131 and a second rail 132. The first rail 131 and the second rail 132 are substantially parallel to each other and extends from an inner surface of the end surface 122, with the first rail 131 adjacent to the sidewall 121. Each rail 131, 132 respectively includes a strip 1310 and a tab 1311 vertically extending from a top portion of the strip 1310, and the two tabs 1311 of the first rail 131 and the second rail 132 extend toward each other. Two substantially parallel bars 1322 are formed on the strip 1310 of the second rail 132, substantially perpendicular to the strip 1310 and the tab 1311. Each bar 1322 defines an arcuate slot 1323 at one end thereof for locking the connector case 20.

Figure 3:
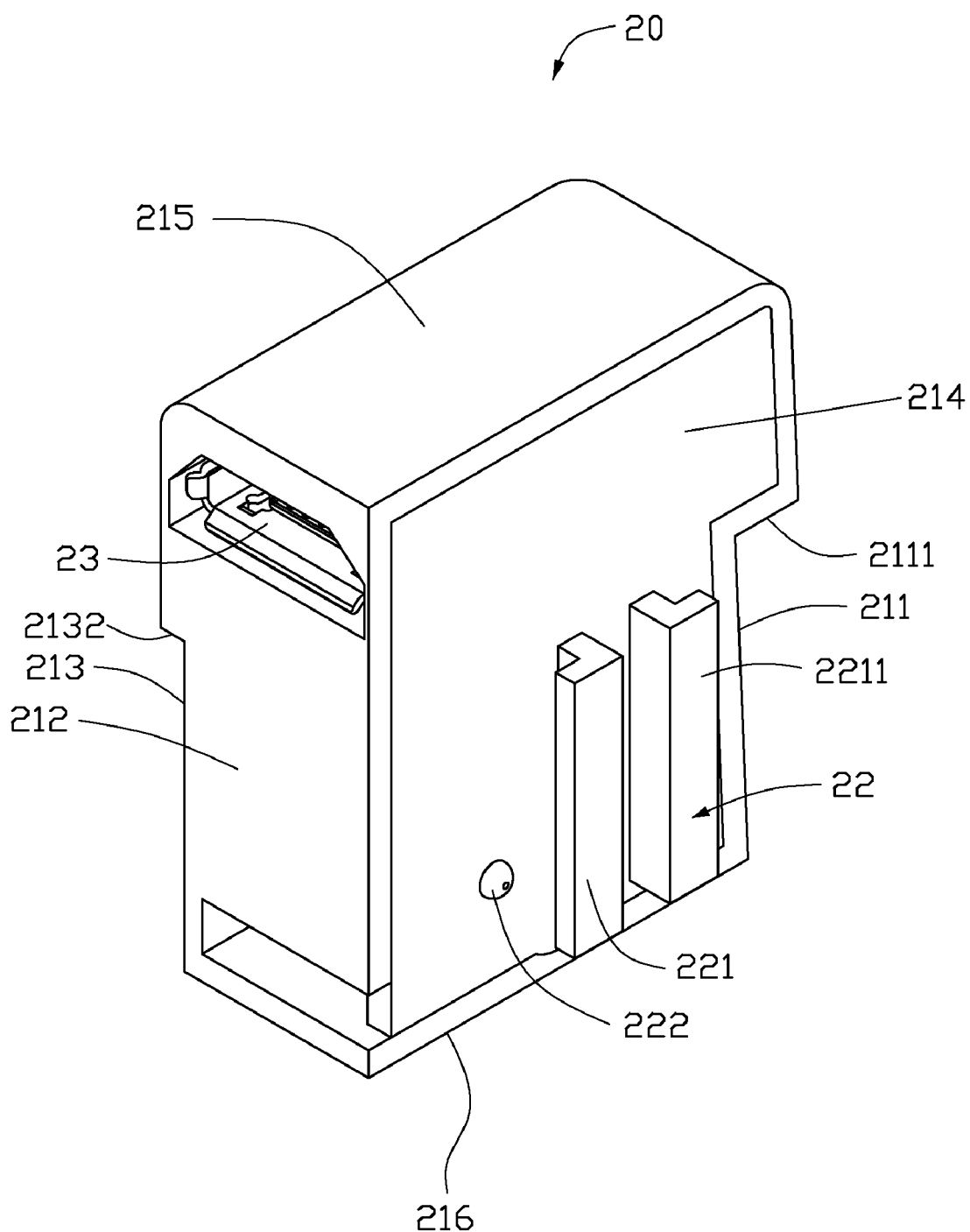
FIG. 3 is a schematic view of the connector case shown in FIG. 1.
Figure 4:
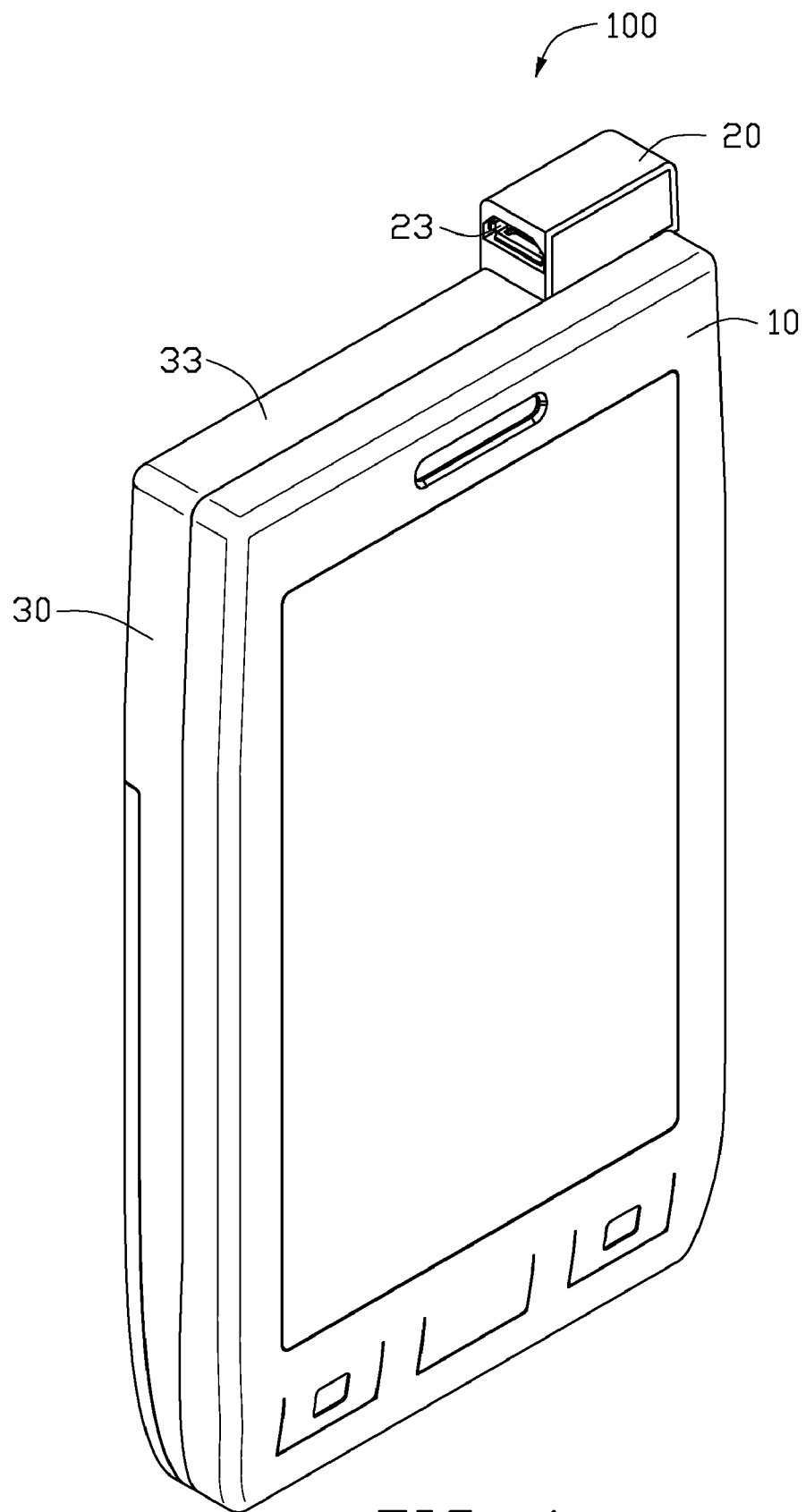
FIG. 4 is similar to FIG. 1, but showing the connector case in a work state.
Figure 5:
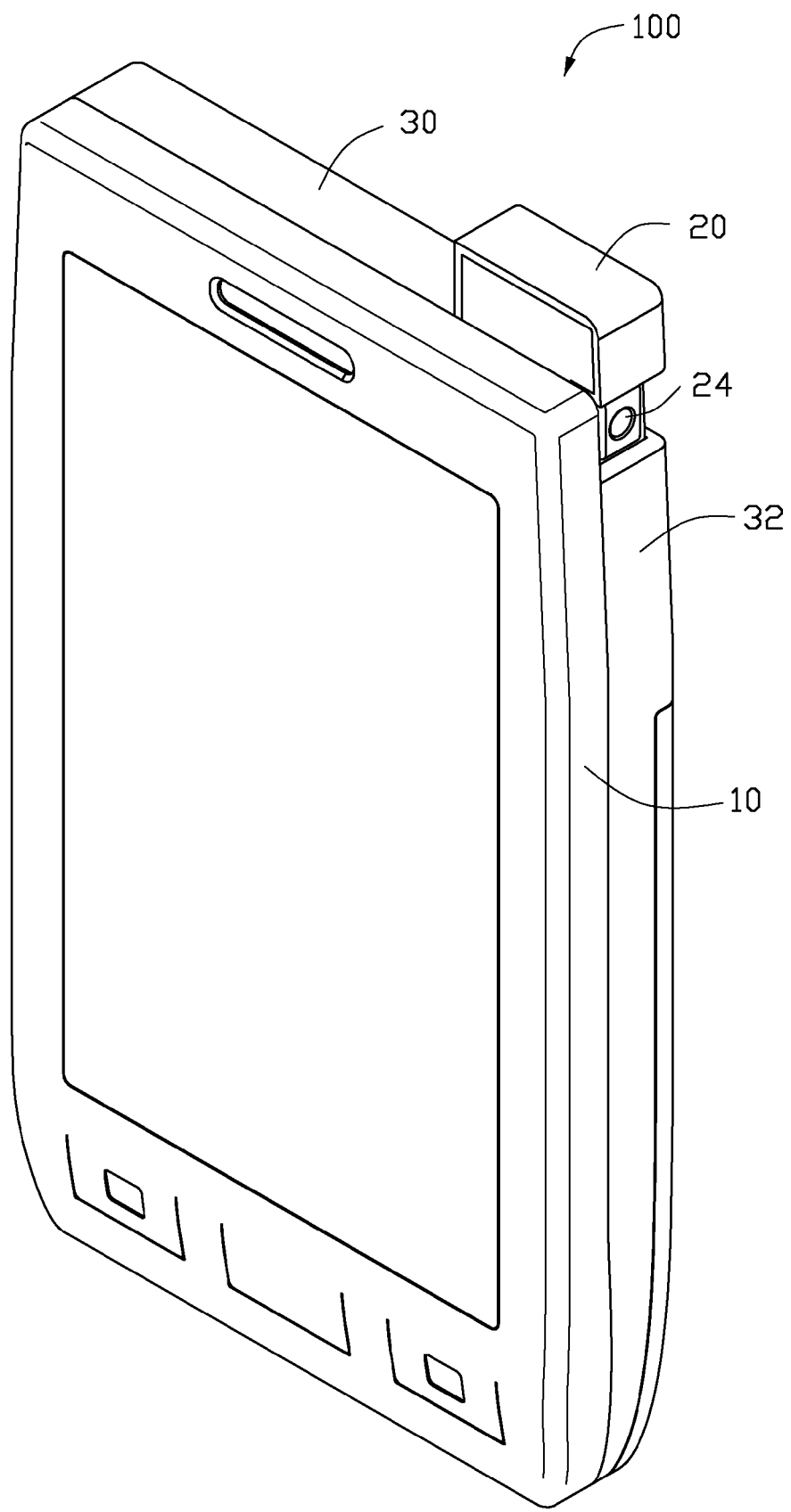
FIG. 5 is similar to FIG. 4, but showing from another aspect.

Also referring to FIG. 3, the connector case 20 includes a first end surface 211, a second end surface 212, a first side surface 213, a second side surface 214, a top surface 215, and a bottom surface 216, wherein the top surface 215. The first end surface 211, the bottom surface 216 and the second end surface 212 surround the second side surface 214 in order. The first end surface 211 and the first side surface 213 respectively form a first step 2111 and a second step 2132, for preventing the connector case 20 from wholly sliding into the cavity 12 of the first housing 10. A microphone interface 24 is set in the first end surface 211, adjacent to the bottom surface 216. An engaging portion 22 is formed on the second side surface 214, and includes two L-shaped latches 221 for engaging with the two rails 131, 132 of the first housing 10. Each latch 221 includes an edge 2211 at a top portion thereof, and the two edges 2211 of the latches 221 extend in opposite directions. A hemispherical protrusion 222 is positioned beside the engaging portion 22, for selectively engaging in the slots 1323 of the guiding portion 13 to stably hold the connector case 20. A USB interface 23 is arranged in the second side surface 214, adjacent to the top surface 215, and a connector (not shown) is arranged in the bottom surface 216 so that a USB or a microphone inserted into the interfaces can electrically connect with a main circuitry of the portable electronic device 100.

The second housing 30 includes a main plate 31, a side flange 32 and an end flange 33 connecting together. A cutout 34 is defined at a joining portion of the main plate 31, the side flange 32 and the end flange 33 for allowing the connector case 20 extend through. The main plate 31 and the end flange 33 respectively have a first cut edge 312 and a second cut edge 322. The first cut edge 312 and the second cut edge 322 respectively match the first step 2132 and the second step 2111, so as to prevent the connector case 20 from wholly moving inside the portable electronic device 100.

In assembly of the portable electronic device 100, the engaging portion 22 of the connector case 20 is engaged with the guiding portion 13 of the first housing 10, so that the connector case 20 is slidable relative to the first housing 10. The second housing 30 is attached to the first housing 10, with the connector case 20 extending through the cutout 34. The first step 2132 and the second step 2111 respectively face the first cut edge 312 and the second cut edge 322.

In use, the connector case 20 is pushed out, and the latches 221 slide along the rails 131, 132 until the protrusion 222 is locked into one slot 1323 adjacent to the end surface 122. The USB interface 23 and the microphone interface 24 are exposed. Thus, users can insert a USB or a connector of a microphone into the USB interface 23 or the microphone interface 24. It should be understood that the latches 221 will resist the end surface 122 when the connector case 20 is further pushed out, which can stop the connector case 20 getting away from the portable electronic device 100.

After use, the connector case 20 is pushed into the cavity 12 until the protrusion 222 is pushed to be locked into the other slot 1323 far away the end surface. It should be understood that the first step 2132 and the second step 2111 will be stopped by the cut edges 312, 322 when the connector case is given a further pushing force, which can stop the connector case 20 further moving inside the portable electronic device 100.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
   a connector case including at least one interface, a protrusion and an engaging portion, the engaging portion includes two latches;
   a guiding portion including two rails, two bars extending from one of the two rails, each bar defining a slot to engage with the protrusion; and
   a space being formed in the portable electronic device; the two latches slidably engaged with the two rails for allowing the connector case to be received in the space; the protrusion selectably locked into one of the slots of the two bars, either in a state of the at least one interface being hidden in the space or in a state of the at least one interface being exposed from the space.

2. The portable electronic device as claimed in claim 1, further comprising a first housing and a second housing, wherein the guiding portion is formed in the first housing, and the second housing defines a cutout allowing the connector case to extend through.

3. The portable electronic device as claimed in claim 2, wherein the connector case includes steps, and the second housing includes cut edges for stopping the steps.

4. The portable electronic device as claimed in claim 1, wherein the two bars are paralleled to each other.

5. The portable electronic device as claimed in claim 4, wherein the protrusion is positioned adjacent to the engaging portion, and each slot defined at a top portion of the corresponding bar.

6. The portable electronic device as claimed in claim 5, wherein the protrusion is hemispherical, and each slot is arcuate.

7. The portable electronic device as claimed in claim 3, wherein the number of interfaces is two, one interface being an USB interface, and the other interface being a microphone interface.

8. The portable electronic device as claimed in claim 7, wherein the connector case further includes a second end surface and a second side surface, the second side surface is positioned between the first end surface and the second end surface, the microphone interface and the USB interface are respectively set in the first end surface and the second end surface, and the engaging portion and the protrusion are formed on the second side surface.

9. A potable electronic device comprising:
   a first housing defining a cavity extending to a wall thereof, two rails are formed in the cavity, two parallel bars extending from one of the two rails, each bar defining a slot;
   a second housing attached to the first housing and defining a cutout communicating to the cavity; and
   a connector case including two latches and a protrusion, the connector case slidably attached to the first housing in the cavity by engagement between the latches and the rails, the connector case including at least one interface, the at least one interface being exposed from the cutout when the protrusion is locked into one slot adjacent to the wall and being hidden in the cavity when the protrusion is locked into the other slot far away from the wall.

10. The portable electronic device as claimed in claim 9, wherein the connector case includes a plurality of steps, and the second housing includes cut edges for stopping the steps.

11. The portable electronic device as claimed in claim 10, wherein the latches are L-shaped.

12. The portable electronic device as claimed in claim 9, wherein the protrusion is positioned adjacent to the latches, and each slot is defined at a top portion of the corresponding bar.

13. The portable electronic device as claimed in claim 12, wherein the connector case further includes a second end surface and a second side surface, the second side surface is positioned between the first end surface and the second end surface, a microphone interface and a USB interface are respectively set in the first end surface and the second end surface, and the latches and the protrusion are formed on the second side surface.

14. A portable electronic device comprising:
   a first housing defining a cavity extending to a wall thereof, two rails formed in the cavity, two parallel bars extending from one of the two rails, each bar defining a slot;
   a second housing attached to the first housing and defining a cutout communicating with the cavity; and
   a connector case including two latches engaged with the rails in the cavity, the connector case including at least one interface and a protrusion, the protrusion selectably locked into one of the two slots, either in a state of the at least one interface being hidden in the cavity or in a state of the at least one interface being exposed from the cavity.

* * * * *